Sept. 12, 1933. L. J. R. HASSELBERG 1,926,619
CULTIVATOR OR OTHER AGRICULTURAL IMPLEMENT
Filed Oct. 8, 1932

Patented Sept. 12, 1933

1,926,619

UNITED STATES PATENT OFFICE 1,926,619

CULTIVATOR OR OTHER AGRICULTURAL IMPLEMENT

Linus Johan Reinhold Hasselberg, Krapperup, Sweden

Application October 8, 1932, Serial No. 636,923, and in Sweden October 12, 1931

4 Claims. (Cl. 97—184)

In cultivators and other agricultural implements provided with a number of tines or other members for working the soil it is known to arrange said tines or other members upon pivotal arms and to connect said arms with each other by means of a wire or the like in such a manner as to enable the arm carrying said tine, when encountering an obstruction, to swing backwards by forcing the other tines or one or more of them encountering less resistance to swing forwards by the intermediary of the wire. Said arrangement shows important disadvantages, in the first place by the fact that the normal working position of the tines becomes vague or, in other terms, that a normal working position of the tines is not attained, especially when working a hard soil or a soil having a large quantity of weeds where the resistance encountering the tines is permanently varying, a normal working position of the tines being necessary in order to make the tines work in a satisfactory manner. Especially in cultivators pulled by tractors, it is desirable to make the tines pivotal in a backward direction when certain of them happen to encounter fixed obstructions or an abnormal resistance, so as to enable said tines to slide over said obstruction without becoming injured and without subjecting the implement to all too heavy stresses, said tine then returning to its normal working position.

The object of the present invention is that of securing such a resiliency of the tines independent of each other that the swinging backwards of certain of said tines has no influence upon the working position of the other tines, the normal working position of the tines thus being a positive one. Furthermore, by such arrangement an accommodation of the force by which the tines are retained in their normal working positions is automatically obtained, in accordance with the average resistance encountering the tines.

Figure 1:
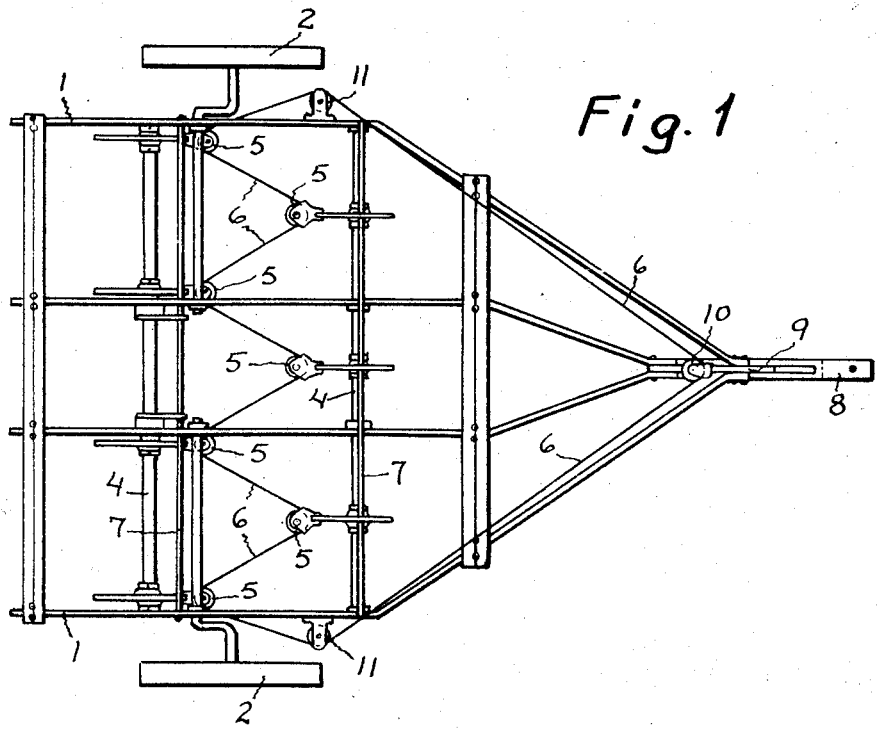
Figure 2:
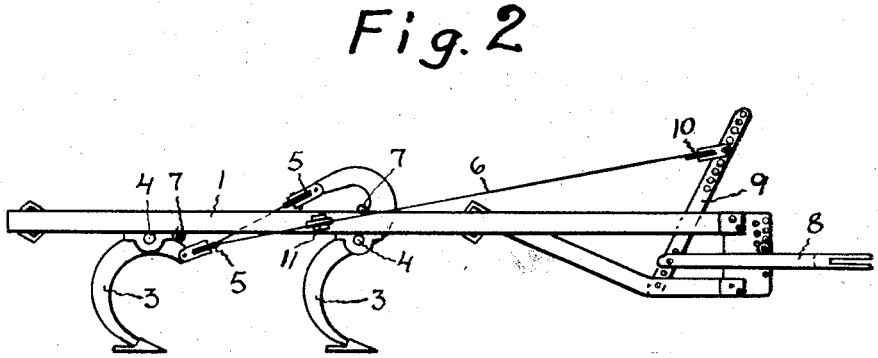

A preferred embodiment of the invention is illustrated in the accompanying drawing, wherein Fig. 1 is a plan view of an improved cultivator in accordance with the invention, whereas Fig. 2 is a side elevation of said cultivator.

In the drawing, 1 is the frame-work, said frame-work being constructed in any suitable manner and mounted upon wheels 2 in such a manner as to be capable of being raised and lowered, as known per se.

The arms 3 carrying the tines or other members for working the soil are pivotally mounted upon shafts 4 mounted in the frame-work. Around said shafts 4 the arms 3 are rotatable in a backward direction in order to permit the tines to slide over fixed obstructions or the like.

The arms 3 are extended beyond the shafts 4 and, at the ends opposite to those carrying the tines, said arms are provided with pulleys 5 for a wire or cable 6, said wire or cable being arranged in such a manner as to press the arms 3 forwardly by the tension of said wire or cable 6.

However, the rotation of the arms 3 in a forward direction is limited by suitable stops 7, for instance consisting of rods secured to the framework in parallel with the shafts 4. Thus the tension of the wire or cable 6 tends to maintain the arms 3 in engagement with the stops 7, and the tines are in their correct working position when the arms 3 are in engagement with the stops 7.

For the purpose of securing the tension of the wire or cable 6 during operation, said wire or cable is connected to the tug-hook 8 of the implement by a lever 9 or the like in such a manner as to transmit to the wire or cable 6 a share of the pulling force necessary for moving the implement. In the embodiment shown in the drawing the lever 9 is pivotally connected with the frame at its lower end, and is normally inclined forwardly at a suitable angle to the vertical when all of the arms 3 of the tines are in engagement with the stops 7. The tug-hook 8 is connected with the lever 9 at a point between its pivot and the point at which the wire or cable 6 is connected to said lever. The point of connection of the tug-hook to the lever 9 or of the wire 6 to said lever 9, or both said points, may be adjustable along said lever 9. Preferably, the wire or cable 6 is endless and passed around as well the pulleys 5 connected to the arms 3 as around a pulley 10 connected to the lever 9, and also passed around guide pulleys 11 which may be necessary and which are connected to the sides of the frame-work 1.

The amount of tractive power at the tug-hook 8 necessary for moving the implement depends upon the average resistance encountering the tines, and through the lever 9 such a share of the tensile strain arising from said tractive power is transmitted to the wire or cable 6 as to enable all of the arms 3 to be maintained in their normal positions in engagement with the stops 7. Only when a tine is encountering an abnormal resistance, such as a fixed stone or the like, the arm carrying said tine swings backwards around its shaft by overcoming the tension of the wire or cable 6 so as to make the lever 9 rotate somewhat in a backward direction. During said movements the positions of operation of the other tines are not changed, and as soon as the tine encountering the obstruction has slidden over said obstruction, it immediately returns to its correct position, the position of operation of the other tines not being changed. When the average resistance against the tines is increased an increased tension is automatically effected in the wire or cable 6, the tines thus being resiliently retained in their correct working positions.

What I claim and desire to secure by Letters Patent is:—

1. A cultivator or other agricultural implement having a frame-work, arms pivotally mounted in said frame-work, tines or other members of working the soil mounted upon said arms, pulleys connected with said arms, a wire or cable mounted to pass around said pulleys and adapted to maintain the arms in a normal position of working but to yield to the arm of a tine encountering an abnormal resistance so as to permit said arm of swinging backwards, fixed stops predetermining said normal position of working of the arms by limiting the rotation or swinging of said arms in a forward direction, a lever pivoted to the frame-work of the implement, a tug-hook pivoted to said lever, said wire or cable, for the purpose of retaining the tines in their normal position, being connected to said lever in such a manner as to transmit to the wire or cable, through said lever, a not very large share of the tractive power necessary for advancing the implement in order to cause a tensile strain at the wire or cable varying with said tractive power at the tug-hook, the larger share of said tractive power being transmitted through the intermediary of said lever to the frame-work of the implement, the total arrangement being such as to permit the arms carrying tines encountering an abnormal resistance of swinging backwards, the other arms remaining in their position of working predetermined by said aforementioned stops.

2. A cultivator or other agricultural implement having a frame-work, arms pivotally mounted in said frame-work, tines or other members of working the soil mounted upon said arms, pulleys connected with said arms, a lever pivoted to the frame-work of the implement, a pulley connected with said lever, an endless wire or cable mounted to pass around the pulleys connected with said arms and also around the pulley connected with said lever and adapted to maintain said arms in a normal position of working but to yield to the arm of a tine encountering an abnormal resistance so as to permit said arm of swinging backwards, fixed stops predetermining said normal position of working of the arms by limiting the rotation or swinging of said arms in a forward direction, a tug-hook pivoted to said lever, said endless wire or cable, for the purpose of retaining the tines in their normal position, being connected to said lever in such a manner as to transmit to the endless wire or cable, through said lever, a not very large share of the tractive power necessary for advancing the implement, in order to cause a tensile strain at the endless wire or cable varying with said tractive power at the tug-hook, the larger share of said tractive power being transmitted through the intermediary of said lever to the frame-work of the implement, the total arrangement being such as to permit the arms carrying tines encountering an abnormal resistance of swinging backwards, the other arms remaining in their position of working predetermined by said aforementioned stops.

3. A cultivator or other agricultural implement having a frame-work, arms pivotally mounted in said frame-work, tines or other members of working the soil mounted upon said arms, pulleys connected with said arms, a wire or cable mounted to pass around said pulleys and adapted to maintain said arms in a normal position of working but to yield to the arm of a tine encountering an abnormal resistance so as to permit said arm of swinging backwards, fixed stops predetermining said normal position of working of the arms by limiting the rotation or swinging of said arms in a forward direction, a lever pivoted to the frame-work of the implement at the lower end of said lever and normally, i. e. when all the tines are in their normal position of working, inclined forwardly at a suitable angle to the vertical, a tug-hook pivoted to said lever at a point above the pivot of the lever, said wire or cable, for the purpose of retaining the tines in their normal position, being connected to said lever, at a point above the point of connection between the lever and the tug-hook in such a manner as to transmit to the wire or cable, through said lever, a not very large share of the tractive power necessary for advancing the implement, in order to cause a tensile strain at the wire or cable varying with said tractive power at the tug-hook, said points of connection between the lever and the tug-hook and between the lever and the wire or cable being displaceable along portions of the lever, the larger share of said tractive power being transmitted through the intermediary of said lever to the frame-work of the implement, the total arrangement being such as to permit the arms carrying tines encountering an abnormal resistance of swinging backwards, the other arms remaining in their position of working predetermined by said aforementioned stops.

4. A cultivator or other agricultural implement having a frame-work, arms pivotally mounted in said frame-work, tines or other members of working the soil mounted upon said arms, pulleys connected with said arms, a lever pivoted to the frame-work of the implement at the lower end of said lever and normally, i. e. when all the tines are in their normal position of working, inclined forwardly at a suitable angle to the vertical, a pulley connected with said lever, an endless wire or cable mounted to pass around the pulleys connected with said arms and also around the pulley connected with said lever and adapted to maintain said arms in the normal position of working but to yield to the arm of a tine encountering an abnormal resistance so as to permit said arm of swinging backwards, fixed stops predetermining said normal position of working of the arms by limiting the rotation or swinging of said arms in a forward direction, a tug-hook pivoted to said lever at a point above the pivot of the lever, said endless wire or cable, for the purpose of retaining the tines in their normal position, being connected to said lever at a point above the point of connection between the lever and the tug-hook in such a manner as to transmit to the endless wire or cable, through said lever, a not very large share of the tractive power necessary for advancing the implement, in order to cause a tensile strain at the endless wire or cable varying with said tractive power at the tug-hook, said points of connection between the lever and the tug-hook and between the lever and the endless wire or cable being displaceable along portions of the lever, the larger share of said tractive power being transmitted through the intermediary of said lever to the frame-work of the implement, the total arrangement being such as to permit the arms carrying tines encountering an abnormal resistance of swinging backwards, the other arms remaining in their position of working predetermined by said aforementioned stops.

LINUS JOHAN REINHOLD HASSELBERG.